(12) United States Patent
Jain

(10) Patent No.: US 11,010,400 B1
(45) Date of Patent: May 18, 2021

(54) COMPUTER FILE COPY SYSTEMS AND METHODS

(71) Applicant: CITIGROUP TECHNOLOGY, INC., Weehawken, NJ (US)

(72) Inventor: Parul K. Jain, East Windsor, NJ (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 389 days.

(21) Appl. No.: 15/433,347

(22) Filed: Feb. 15, 2017

(51) Int. Cl.
| | | |
|---|---|---|
| *G06F 16/27* | (2019.01) | |
| *G06F 3/06* | (2006.01) | |
| *G06F 16/172* | (2019.01) | |

(52) U.S. Cl.
CPC .............. *G06F 16/27* (2019.01); *G06F 3/065* (2013.01); *G06F 3/067* (2013.01); *G06F 3/0619* (2013.01); *G06F 3/0643* (2013.01); *G06F 3/0656* (2013.01); *G06F 16/172* (2019.01)

(58) Field of Classification Search
CPC ...... G06F 16/27; G06F 16/172; G06F 3/0619; G06F 3/0643; G06F 3/065; G06F 3/0656; G06F 3/067
See application file for complete search history.

(56) References Cited

U.S. PATENT DOCUMENTS

| | | | | |
|---|---|---|---|---|
| 5,247,665 A * | 9/1993 | Matsuda | ............... | G06F 16/284 |
| 7,251,747 B1 * | 7/2007 | Bean | ................... | G06F 11/1443 |
| | | | | 714/15 |
| 7,307,998 B1 * | 12/2007 | Wang | ..................... | H04L 49/90 |
| | | | | 370/412 |
| 8,560,788 B1 * | 10/2013 | Sreedharan | ......... | G06F 11/1461 |
| | | | | 711/162 |
| 9,165,001 B1 * | 10/2015 | Upadhyay | ........... | G06F 16/1748 |
| 9,213,721 B1 * | 12/2015 | Faibish | ................. | G06F 16/185 |
| 10,069,909 B1 * | 9/2018 | Chopra | ................... | H04L 65/80 |
| 2002/0161856 A1 * | 10/2002 | Pineau | ............... | H04N 1/00127 |
| | | | | 709/219 |
| 2004/0015662 A1 * | 1/2004 | Cummings | ........... | G06F 3/0679 |
| | | | | 711/154 |
| 2005/0076136 A1 * | 4/2005 | Cho | .................. | H04L 29/06027 |
| | | | | 709/231 |
| 2006/0271697 A1 * | 11/2006 | Kruse | ............... | H04L 29/08072 |
| | | | | 709/230 |
| 2007/0122118 A1 * | 5/2007 | Seo | ..................... | G11B 27/002 |
| | | | | 386/241 |

(Continued)

*Primary Examiner* — Kris E Mackes
*Assistant Examiner* — Tiffany Thuy Bui
(74) *Attorney, Agent, or Firm* — Johnson, Marcou, Isaacs & Nix, LLC; George Marcou; Scott A. Hendrix

(57) ABSTRACT

Computer file copy systems and methods in which a list of files to be transferred from storage on a source file storage computer is sorted by one or more processors of a copy computer in ascending order from a smallest file size to a largest file size. Thereafter, files having the smallest file sizes are selected from the sorted files such that a total size of the selected files is equal to or less than a total size of memory available on the copy computer, the selected files are copied concurrently with one another from storage on the source file storage computer to the available copy computer memory by the one or more processors, the files are written concurrently with one another from the memory on the copy computer to storage on a target file storage computer by the one or more processors, and the process is performed iteratively.

8 Claims, 8 Drawing Sheets

(56) References Cited

U.S. PATENT DOCUMENTS

| | | | |
|---|---|---|---|
| 2009/0150697 A1* | 6/2009 | Yang | G06F 1/3203 |
| | | | 713/323 |
| 2011/0004601 A1* | 1/2011 | Peckham | G06F 11/1453 |
| | | | 707/752 |
| 2013/0159646 A1* | 6/2013 | Atzmon | G06F 11/1466 |
| | | | 711/162 |
| 2014/0149535 A1* | 5/2014 | Fong | H04W 52/0216 |
| | | | 709/214 |
| 2016/0162216 A1* | 6/2016 | Nukariya | G06F 3/0625 |
| | | | 711/111 |
| 2016/0197844 A1* | 7/2016 | Smith | H04L 41/5041 |
| | | | 709/226 |
| 2016/0224788 A1* | 8/2016 | Coronado | G06F 21/566 |
| 2017/0126779 A1* | 5/2017 | Dong | H04L 67/06 |

* cited by examiner

| Cycle (Each cycle is 60ms) | File and Size | Cumulative Total of File Size |
|---|---|---|
| 1 | 600 — A - 0.1 MB | 0.1 MB |
| 1 | 602 — B - 3 MB | 3.1 MB |
| 2 | 604 — C - 1 MB | 4.1 MB - will not fit so do in next cycle<br><br>1 MB |
| 2 | 606 — D - 0.5 MB | 1.5 MB |
| 2 | 608 — E - 1 MB | 2.5 MB |
| 2 | 610 — F - 1 MB | 3.5 MB |
| 3 | 612 — G - 1 MB | 4.5 MB - will not fit so do in next cycle |
| Total = 180 ms | | |

FIG. 6

| Cycle (Each cycle is 60ms) | File and Size | Cumulative Total of File Size |
|---|---|---|
| 1    600 | A - 0.1 MB | 0.1 MB |
| 1    606 | B - 0.5 MB | 0.6 MB |
| 1    604 | C - 1 MB | 1.6 MB |
| 1    608 | E - 1 MB | 2.6 MB |
| 1    610 | F - 1 MB | 3.6 MB |
| 2    612 | G - 1 MB | 4.6 MB - will not fit so do in next cycle<br><br>1 MB |
| 2    602 | B - 3 MB | 4 MB |
| Total = 120 ms | | |

FIG. 7

CONTINUE FROM STEP 8004 IN FIG. 8A

8005

THE PROCESSOR OF THE COPY COMPUTER MAY REPEAT STEPS 8003 AND 8004 UNTIL A FILE IS ENCOUNTERED, THE SIZE OF WHICH IS LARGER THAN THE AVAILABLE MEMORY ON THE COPY COMPUTER

8006

WHEN A FILE IS ENCOUNTERED WHOSE SIZE IS LARGER THAN THE AVAILABLE MEMORY ON THE COPY COMPUTER, THE PROCESSOR OF THE COPY COMPUTER MAY BREAK THE FILE WHOSE SIZE IS LARGER THAN THE AVAILABLE MEMORY INTO PARTS OF SIZE EQUAL TO THE NETWORK MTU, CREATE MTU-SIZED BUFFERS TO FILL UP THE AVAILABLE MEMORY, AND SIMULTANEOUSLY COPY AS MANY PARTS OF THE FILE WHOSE SIZE IS LARGER THAN THE AVAILABLE MEMORY AS THE NUMBER OF THE BUFFERS

8007

THE PROCESSOR OF THE COPY COMPUTER MAY REPEAT STEP 8006 FOR EACH SUCCEEDING FILE

FIG. 8B

COMPUTER FILE COPY SYSTEMS AND METHODS

FIELD OF THE INVENTION

The present invention relates generally to computer file copy technology, and more particularly to technological solutions implementing computer file copy systems and methods.

BACKGROUND OF THE INVENTION

Typically, employees of all types of enterprises, also referred to herein as users, are furnished computers, such as desktop computers, running software, such as MICROSOFT OFFICE® suite of desktop business applications, which they may use to create documents, referred to as files, such as MICROSOFT WORD® document files or POWER-POINT® document files. It is to be understood that such files may be referred to collectively herein as "desktop data". It is to be further understood that the terms "file" and "document" may be used interchangeably herein and that the terms "user" and "employee" may likewise be used interchangeably herein. For example using a word processing application, such as MICROSOFT WORD®, such users may create documents that are stored on their computers as files whose names end, for example, with ".doc" or ".docx".

It is well known that users' computers may be damaged by any number of different causes resulting in the destruction of documents which the users have created on such computers and that users' computers may be lost or stolen resulting in loss of such documents. It is also a relatively common occurrence for a user who normally uses a particular computer to need or wish to work with documents created on a different computer. To address such issues, enterprises may typically make available separate, highly-reliable enterprise computers on the enterprises' computer networks, the only purpose of which is to store files, for example, in a centralized location instead of on the users' desktops, which may be damaged or stolen resulting in loss of the users' files.

Thus, when a user saves a file, such as a WORD® document or a POWERPOINT® document, the file actually travels over the enterprise's computer network and is stored into such separate enterprise computer which may be referred to herein as a file server. A file server may be a computer having one or more processors that is attached to a computer network. The primary purpose of a file server may be to provide a location, for example, for shared disk access for shared storage of computer files, such as documents, sound files, photographs, movies, images, and databases, that can be accessed by users' computers that are attached to the same computer network. Such file servers may be connected to users' computers on an enterprise computer network and thus store documents for many different users in the enterprise. One such file server may be used, for example, by hundreds of enterprise users, and there may be hundreds of file servers in a large enterprise which may be used by multiple business units in multiple different geographical areas.

It is to be understood that desktop data of a large enterprise may include billions of files created by thousands of employees of the enterprise located throughout the world. Further, for various reasons, it may be necessary to continually copy many thousands of those files from one enterprise file server to another. For example, file servers may comprise computer hardware and software that are depreciable by an enterprise, and when fully depreciated, such file servers may be retired and replaced with newer file servers by the enterprise. When that occurs, all of the files stored on the file servers being retired and replaced must be copied from the file servers being retired to the newer file servers.

For another example, an enterprise's file servers may typically be located in the enterprise's data centers with other information technology (IT), and it is not uncommon for enterprises to close and replace existing data centers with new data centers to align with an enterprise's business strategy and/or for cost reasons. Further, when users move between regions of a global enterprise, as often happens, it may typically be desirable for such users to have their files stored on the nearest enterprise file server in order to assure optimum performance when working with their files.

In addition, in some cases, copies of user files may be required to be stored on a designated file server from which the user may not delete the files. This may be true, for example, in regulated industries, such as financial institutions, in which particular user documents may comprise business records that must be retained for specific periods of time. Additionally, as technology advances, new types of file servers that provide higher performance and/or reliability at a lower cost may become available to replace existing enterprise file servers. For example, object storage file servers may be currently gaining popularity over traditional Server Message Block (SMB) and Network File Systems (NFS) file servers.

As noted, an enterprise user may typically have thousands of files stored on an enterprise file server; there may be hundreds of enterprise users using the same file server; and there may be thousands of file servers across the enterprise. Thus, it is self-apparent that when it becomes necessary to copy such massive numbers of files, for example, from one enterprise file server to another enterprise file server, the process may require an enormous amount of computer processing time and computer memory.

For example, in the current file copy process, a copy application may be written that runs on one or more processors of a copy computer to access the file server from which files are to be copied, referred to herein as a source file server, over an enterprise computer network and request the files. The source file server processor may then acknowledge the command, perform the requested processing, and send the requested data to the processor running the copy application.

When the processor running the copy application sends commands over the enterprise network to the source file server processor, a finite amount of time is required for the command to reach the source file server, and a finite amount of time is likewise required for the response from the source file server processor to reach the processor running the copy application. Similarly, when the processor running the copy application accesses the processor of the target file server processor over the enterprise network to write the copied files to the target file server processor, every command and response sent requires a finite amount of time to travel over the enterprise network.

These respective finite amounts of time may be referred to as "network latency", a term used to describe any type of delay that occurs in data communication over a network, such as an enterprise computer network. Since there is at least some associated network latency in every transaction between the processor running the copy application and the processors of the source file server and the target file server, it will be appreciated that network latency associated, for example, with hundreds of thousands of such transactions may be significantly large. Further, it is self-apparent that in copying large numbers of small files from a source file server to a target file server, such network latency may be especially large and especially significant.

There is a present need for technological solutions that address the network latency problems of legacy file copy approaches and to provide mechanisms that employ, for example, one or more algorithms that enable far more effective and efficient utilization of computer processing and memory in rapidly reading and copying extremely large numbers of small files from a source file storage computer to a target source file storage computer in spite of network latency. The problem that is solved by embodiments of the invention is rooted in technological limitations of such legacy approaches. Improved techniques and in particular an improved application of technology is needed to address the problems of currently employed mechanisms. More specifically, the technologies applied in the aforementioned legacy approaches fail to achieve the sought-after capabilities of the herein-disclosed techniques for improved file copy systems and methods

SUMMARY OF THE INVENTION

Embodiments of the invention advance the technical fields for addressing problems associated with the above described currently employed file copy mechanisms, as well as advancing peripheral technical fields. Such embodiments are directed to technological solutions that may involve a system that includes, for example, a copy computer having one or more processors coupled to memory and communicatively coupled over a network to a source file storage computer and to a target file storage computer, and a sort function of the one of more processors of the copy computer that sorts a list of files to be transferred from storage on the source file storage computer in ascending order from a smallest file size to a largest file size.

Such system for embodiments of the invention may also include, for example, a select function of the one of more processors of the copy computer that selects files from the sorted files having the smallest file sizes such that a total size of the selected files is equal to or less than a total size of memory available on the copy computer, a copy function of the one of more processors of the copy computer that copies the selected files concurrently with one another from storage on the source file storage computer to said memory available on the copy computer, and a write function of the one of more processors of the copy computer that writes the copied files concurrently with one another from said memory on the copy computer to storage on the target file storage computer.

In an aspect of the system for embodiments of the invention, the copy computer may further comprise, for example, the one or more processors executing a copy application. In an additional aspect, the network may further comprise, for example, a computer network using Transmission Control Protocol/Internet Protocol. A further aspect may involve, for example, a list function of the one of more processors of the copy computer that compiles the list of the files to be transferred from storage on the source file storage computer. Another aspect may involve, for example, a scan function of the one of more processors of the copy computer that scans the source file storage computer and identifies the files for the list of the files to be transferred from storage on the source file storage computer.

In still another aspect of the system for embodiments of the invention, for example, the copy function of the one of more processors of the copy computer may issue a series of commands to a processor of the source file storage computer. In a still further aspect, for example, the copy function of the one of more processors of the copy computer may issue the series of commands comprising an open file command, a read file command, and a close file command to the processor of the source file storage computer. In a further aspect, for example, the copy function of the one of more processors of the copy computer may issue the open file command to the processor of the source file storage computer to prepare the selected files for reading. In additional aspects, for example, the copy function of the one of more processors of the copy computer may copy the selected files concurrently with one another from storage on the source file storage computer to said memory available on the copy computer using multiple threads.

In another aspect of the system for embodiments of the invention, for example, the select function of the one of more processors of the copy computer may iteratively select additional files from the sorted files having the smallest file sizes such that a total size of additional selected files is equal to or less than a total size of memory available on the copy computer. In further aspects, for example, the copy function of the one of more processors of the copy computer may iteratively copy the additional selected files concurrently with one another from storage on the source file storage computer to said memory available on the copy computer. In still further aspects, for example, the copy function of the one of more processors of the copy computer may iteratively copy the additional selected files concurrently with one another from storage on the source file storage computer to said memory available on the copy computer.

Additional aspects of the system for embodiments of the invention may comprise, for example, a file size function of the one or more processors of the copy computer that may, upon encountering a file in the sorted files having a size that is greater than a total size of memory available on the copy computer, break the encountered file into parts, each having a size equal to a predetermined maximum transmission unit for the network, and create buffers having sizes equal to the predetermined maximum transmission unit and filling the memory available on the copy computer. In another aspect, for example, the copy function of the one of more processors of the copy computer may copy a number of said parts of said encountered file equal to a number of said buffers having sizes equal to the predetermined maximum transmission unit concurrently with one another.

Embodiments directed to the technological solutions described herein may also involve a method that includes, for example, sorting, by a sort function of one of more processors of a copy computer, a list of files to be transferred from storage on a source file storage computer coupled over a network to the copy computer in ascending order from a smallest file size to a largest file size; selecting, by a select function of the one of more processors of the copy computer, files from the sorted files having the smallest file sizes such that a total size of the selected files is equal to or less than a total size of memory available on the copy computer coupled to the one or more processors of the copy computer; copying, by a copy function of the one of more processors of the copy computer, the selected files concurrently with one another from storage on the source file storage computer to said memory available on the copy computer; and writing, by a write function of the one of more processors of the copy computer, the copied files concurrently with one another from said memory on the copy computer to storage on a target file storage computer coupled over the network to the copy computer.

Other aspects of such method for embodiments of the invention may involve, for example, iteratively selecting, by the select function of the one of more processors of the copy computer, additional files from the sorted files having the smallest file sizes such that a total size of additional selected files is equal to or less than a total size of memory available on the copy computer. Further aspects may involve, for example, iteratively copying, by the copy function of the one of more processors of the copy computer, the additional selected files concurrently with one another from storage on the source file storage computer to said memory available on the copy computer. Still further aspects may involve, for example, iteratively writing, by the write function of the one of more processors of the copy computer, the additional copied files concurrently with one another from said memory on the copy computer to storage on the target file storage computer.

Still another aspect of the method for embodiments of the invention may involve, for example, upon encountering a file in the sorted files having a size that is greater than a total size of memory available on the copy computer, breaking, by a file size function of the one or more processors of the copy computer, said encountered file into parts, each having a size equal to a predetermined maximum transmission unit for the network. Additional aspects may involve, for example, copying, by the copy function of the one of more processors of the copy computer, a number of said parts of said encountered file equal to a number of said buffers having sizes equal to the predetermined maximum transmission unit concurrently with one another.

Embodiments of the invention may employ computer hardware and software, including, without limitation, one or more processors coupled to memory and non-transitory computer-readable storage media with one or more executable programs stored thereon which instruct the processors to perform the methods described herein.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 6 is a table that illustrates an example of a copy program executing on a processor of a copy computer using variable buffer sizes in storing data read from a source file computer in a sequence in which they are stored on the source file server for embodiments of the invention;

FIG. 7 is a table that illustrates an example of a copy program executing on a processor of a copy computer using variable buffer sizes in which files to be read are first sorted according to ascending file size for embodiments of the invention;

FIGS. 8A and 8B show a flow chart that illustrates an example of a process of copying a large number of small files over high latency networks using systems and methods for embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention address network latency problems in copying large numbers of small files from one file server to another. A reason that network latency problems are more significant with large numbers of smaller files is that while small files themselves do not require a long period of time to travel over the network from one file server to another, commands to a source file server processor, for example, to open, read, and close a file, and to a target file server processor to write a copied file to the target file server processor that travel back and forth consume significant amounts of time relative to the time it takes for the file itself to be transferred.

In order to address such network latency problems, embodiments of the invention may provide an algorithm which employs several techniques to allow small files to be read and copied by a copy computer processor from a source file server to a target file server rapidly in spite of network latency. One such technique for embodiments of the invention may be, for example, to select multiple files to copy in parallel based on the amount of memory that is available in the copy computer. Another such technique for embodiments of the invention may be, for example, to scan the source file server to identify all the files that need to be copied, make a list of those files, and arrange those files in an ascending order by file size before the copy process is initiated. Thus, embodiments of the invention may utilize computer memory very differently and far more effectively than legacy copy programs.

Figure 1:
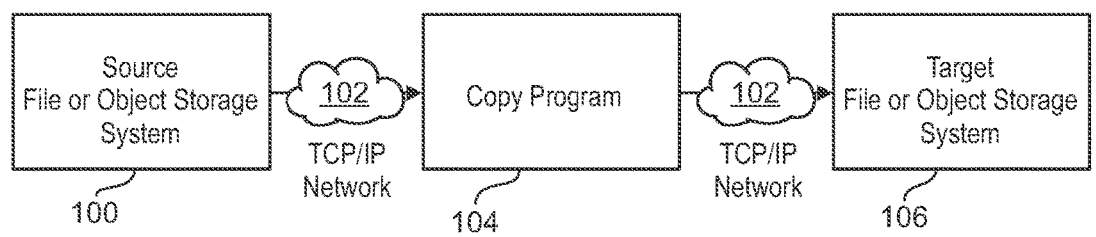
FIG. 1 is a schematic diagram that illustrates an overview example of components and flow of information between components employed in a process of copying files from a source file server to a target file server for embodiments of the invention.

FIG. 1 is a schematic diagram that illustrates an overview example of components and flow of information between components employed in a process of copying files from a source file server to a target file server for embodiments of the invention. Referring to FIG. 1, the process of copying files from a source file server to a target file server may involve, for example, a source file server 100 that is the file server storing files that are to be copied. Referring again to FIG. 1, the source computer 100 may by coupled, for example, over a computer network 102 running the Transmission Control Protocol/Internet Protocol (TCP/IP), to a copy computer 104. The copy computer 104 running, for example, a copy program or application, may access the source computer 100 over the TCP/IP computer network 102.

Referring further to FIG. 1, the copy computer 104 may also access, for example, a target computer 106, which is the target file server to which the files are to be copied. The target computer 106 may likewise be coupled, for example, over the computer network 102 running the TCP/IP protocol, to the copy computer 104. The copy computer 104 running, for example, the copy program, may access the target computer 106 over the TCP/IP computer network 102. It its to be understood that the copy program may be an application executing on one or more microprocessors of the copy computer 104, which may be coupled over the computer network 102 to one or more microprocessors of the source file server 100 and also coupled over the computer network 102 to one or more microprocessors of the target file server or system 106.

Figure 2:
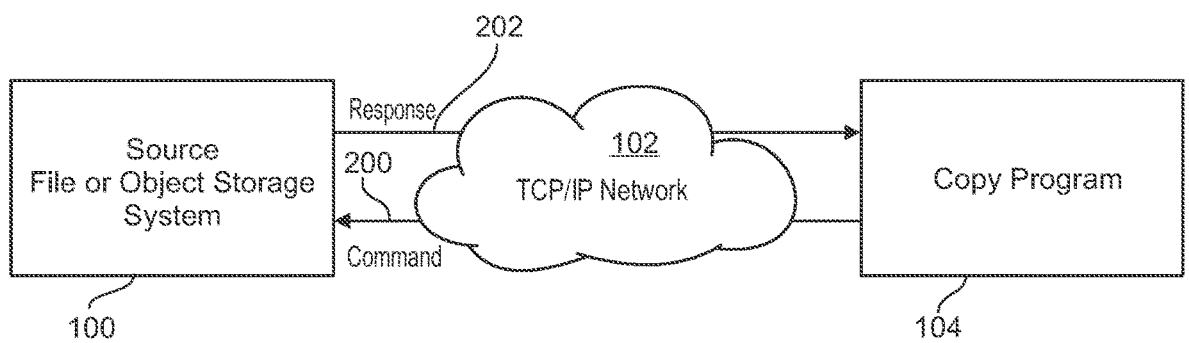
FIG. 2 is a schematic diagram that illustrates further details of examples of components and flow of information between components in the process of copying files from a source file server for embodiments of the invention.

FIG. 2 is a schematic diagram that illustrates further details of examples of components and flow of information between components in the process of copying files from a source file server for embodiments of the invention. Referring to FIG. 2, as noted, the source computer 100 may by coupled, for example, over the TCP/IP computer network 102 to the copy computer 104 running, for example, the copy program. Referring further to FIG. 2, in aspects of the file copy process, a processor of the copy computer 104 may issue one or more commands 200 over the network 102 to a processor of the source computer 100, which may return one or more responses 202 over the network 102 to the processor of the copy computer 100.

The time that is required for the processor of the copy computer 104 to receive a response 202 to a command 200 from the processor of the source computer 100 may be referred to herein as network latency. Typical network latency between computers within a same datacenter may be, for example, five milliseconds, and between computers in different datacenters in a same geographical region may be, for example, 20 milliseconds. The typical network latency between computers in datacenters in different geographical regions, such as Asia and North America, may be as great as 45 milliseconds.

Figure 3:
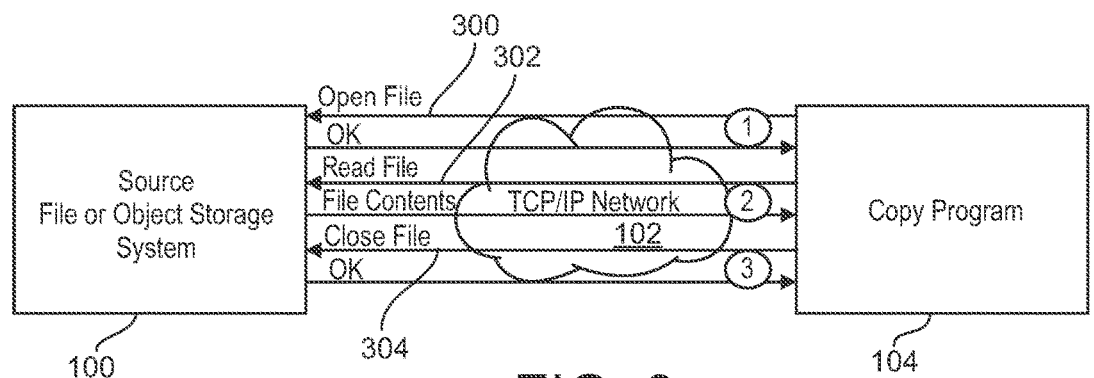
FIG. 3 is a schematic diagram that illustrates an example of still additional details of components and flow of information between components in the process of copying files from a source file server for embodiments of the invention.

FIG. 3 is a schematic diagram that illustrates an example of still additional details of components and flow of information between components in the process of copying files from a source file server for embodiments of the invention. Referring to FIG. 3, there may typically be a minimum number of three interactions between the processor of the copy computer 104 and the processor of the source computer 100 to read a file from the source computer 100 into the memory of the copy program computer 104. Realistically, depending, for example, on the protocol employed, more than three such interactions may be required. However, assuming, for example, the minimum number of only three such interactions, a first such interaction may be an open file command 300 from the processor of the copy computer 104 to the processor of the source computer 100. The open file command 300 is a command to the source computer 100 to prepare a file for reading.

A second such command may be, for example, a read file contents command 302, and the final such command may be a close file command 304. Assuming, for example, that the network latency between the source computer 100 and the copy computer 104 on which the copy program may be running is 20 milliseconds, the open file 300, read file contents 302 and close file 304 commands may require a total of three times 20 milliseconds or 60 milliseconds to complete. While additional time may be required for the contents of the file to be read as part of the response to the read file contents command 302, that additional time may be disregarded for the present example.

Thus, assuming a 20 milliseconds network latency, a minimum time required to transfer a file from the source computer 100 to the copy computer 104 may be 60 milliseconds. Presently, most enterprise desktop data may comprise, for example, MICROSOFT OFFICE® files, which may be relatively small in size. Further, a recent investigation of a typical departmental file server of an enterprise revealed that out of a total of 100,000 files stored on the file server, 65,000 of those files amounted to a total of only about 200 megabytes of stored data, which is an average size of only about 3 kilobytes per file for those 65,000 files.

With file sizes so small, it will be appreciated that the time spent in exchanging commands between the processor of a copy computer 104 and a processor of the source computer 100 may be significantly greater than the time spent in transferring file content from the source computer 100 to the copy computer 104. Embodiments of the invention provide file copy systems and methods that greatly reduce the time spent in exchanging commands between a processor of a copy computer 104 and a processor of a file server computer, such as source 100 and target computer 106, when large numbers of relatively small files are copied over a network, such as TCP/IP network 102, that has a significant network latency.

A solution for dealing with network latency may be to issue simultaneous file copy requests to a file server either by using separate network channels or by sending commands without waiting for responses, referred to as pipelining. Assuming that reading each file requires 60 milliseconds, reading 1,000 files simultaneously should likewise require only 60 milliseconds. Thus, in theory, 1,000 files may be read in more or less the same amount of time as a single file. However, because file content is read into memory of the processor of the copy computer, and memory is a severely limited resource, management of memory is a significant challenge which is addressed by embodiments of the invention.

A file copy program executing on a processor of the copy computer may use multiple workers, referred to as threads, and each of the multiple threads may be responsible for copying a single file. The file that is being copied must first be read from source server computer, and then written to the target server computer. Further, the bytes of data that are read from the source file computer must first be stored in memory, referred to as buffer, until those bytes of data are written to the target file computer. The storage area in memory may be referred to as buffer, and each thread may use a predetermined fixed amount of memory as buffer. If a file is smaller than the size of the buffer, there may be unused buffer space, and if a file size is larger than the buffer size, the file may be copied in pieces, with the size of each piece being the equal to or smaller than the size of the buffer. This fixed buffer size design wastes memory, and severely restricts the number of small files that may be copied in parallel from a processor of a source file computer to a processor of a target file computer.

Figure 4:
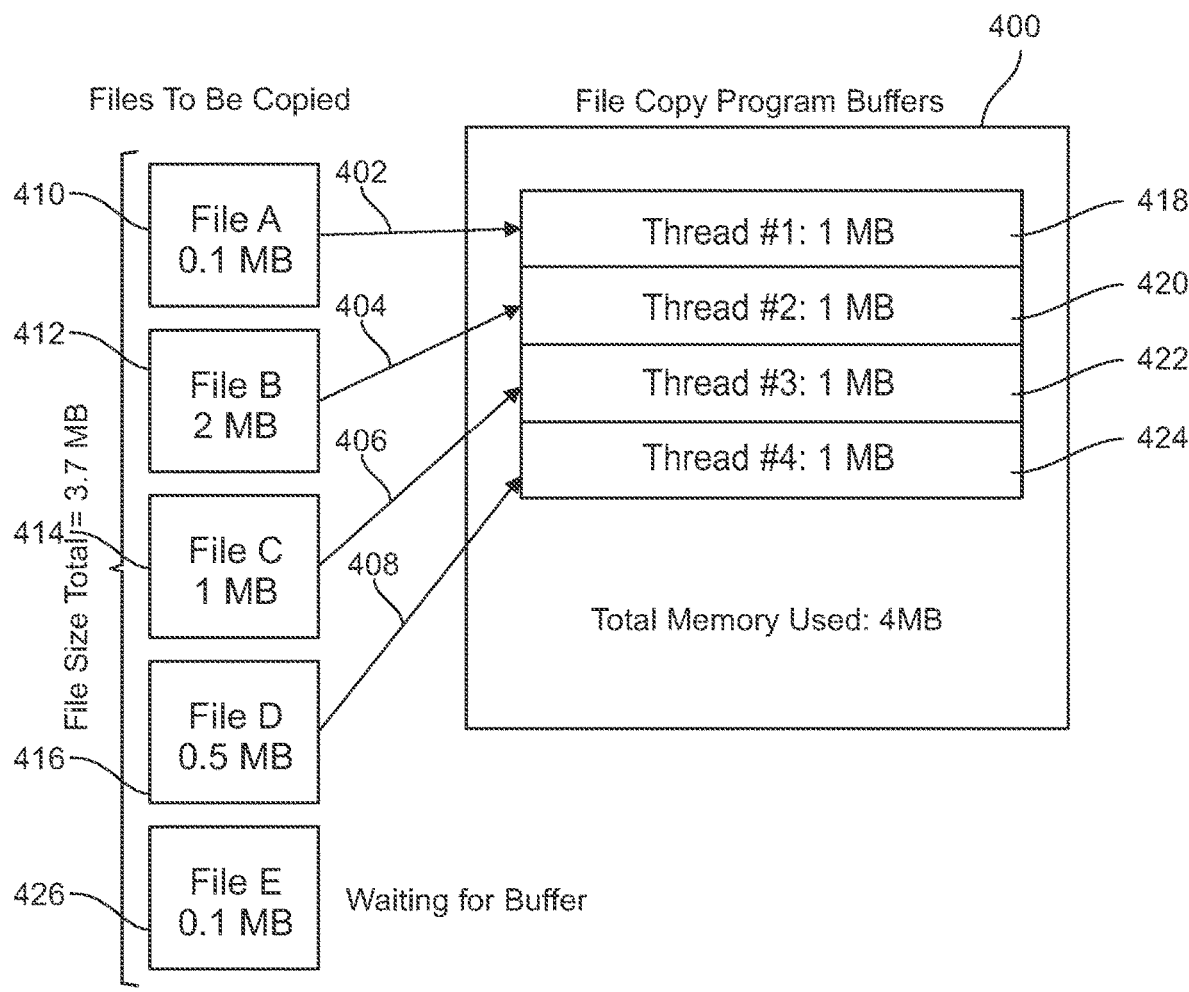
FIG. 4 is a schematic diagram illustrating an example of a copy program executing on a processor of a copy computer using fixed buffer size for storing data read from a source file computer for embodiments of the invention.

As noted, an aspect of embodiments of the invention may be to select multiple files to copy in parallel based on the amount of memory that is available in the copy computer. FIG. 4 is a schematic diagram illustrating an example of a copy program executing on a processor of a copy computer using fixed buffer size for storing data read from a source file computer for embodiments of the invention. Referring to FIG. 4, assume, for example, that a copy program executing on a processor of a copy computer 104 may use only four megabytes of total memory 400. Assume also that the processor of the copy computer uses four threads, 402, 404, 406, and 408 in order to copy four files 410, 412, 414, and 416 from the source computer in parallel. Assume further that the processor of the copy computer allocates and equal amount of available memory 418, 420, 422, and 424 to each of the four threads 402, 404, 406, and 408 so that each thread has a buffer of one megabyte.

Referring further to FIG. 4, assuming there are five files 410, 412, 414, 416, and 426 to be copied from the source computer, each of the four threads 402, 404, 406, and 408 may copy only one of those five files at a time. For example, thread 402 may copy file 410 of 0.1 megabytes in its entirety because it fits in one-megabyte buffer 418. However, thread 404 is unable to copy entire file 412 of two megabytes because it cannot fit in one-megabyte buffer 420, so thread 404 may first copy one megabyte of file 412 and thereafter copy the remaining one megabyte of file 412. In addition, file 414 having one megabyte and file 416 having 0.5 megabyte may each be copied in a single operation by threads 406 and 408, respectively, because file 414 fits in one-megabyte buffer 422 and file 416 fits in one-megabyte buffer 424. Finally, it is necessary to delay copying file 426 until one of the four threads 402, 404, 406, and 408 have finished copying the other four files 410, 412, 414, and 416.

As previously noted, reading a file into a buffer may involve the three operations, such as file open 300, file read 302 and file close 304. In the foregoing example of FIG. 4, files 410, 414, and 416 may be read in parallel and require a total of three operations of twenty milliseconds each, for a total of sixty milliseconds to complete. Simultaneously, file 412 may be opened and read in part, but not closed. In a succeeding cycle, the remaining part of file 412 may be read and closed, and simultaneously previously delayed file 426 may also be opened, read and closed. Such succeeding cycle may likewise require a total of three operations of twenty milliseconds each, for a total of sixty milliseconds to complete, and the total time required to read all five files into the buffer may be 120 milliseconds. Consequently, while the total size of all files is 3.7 megabytes and the available memory to the copy program executing on the copy computer is 4 megabytes, because the buffers have a fixed size, two cycles are required to complete the file copy.

Figure 5:
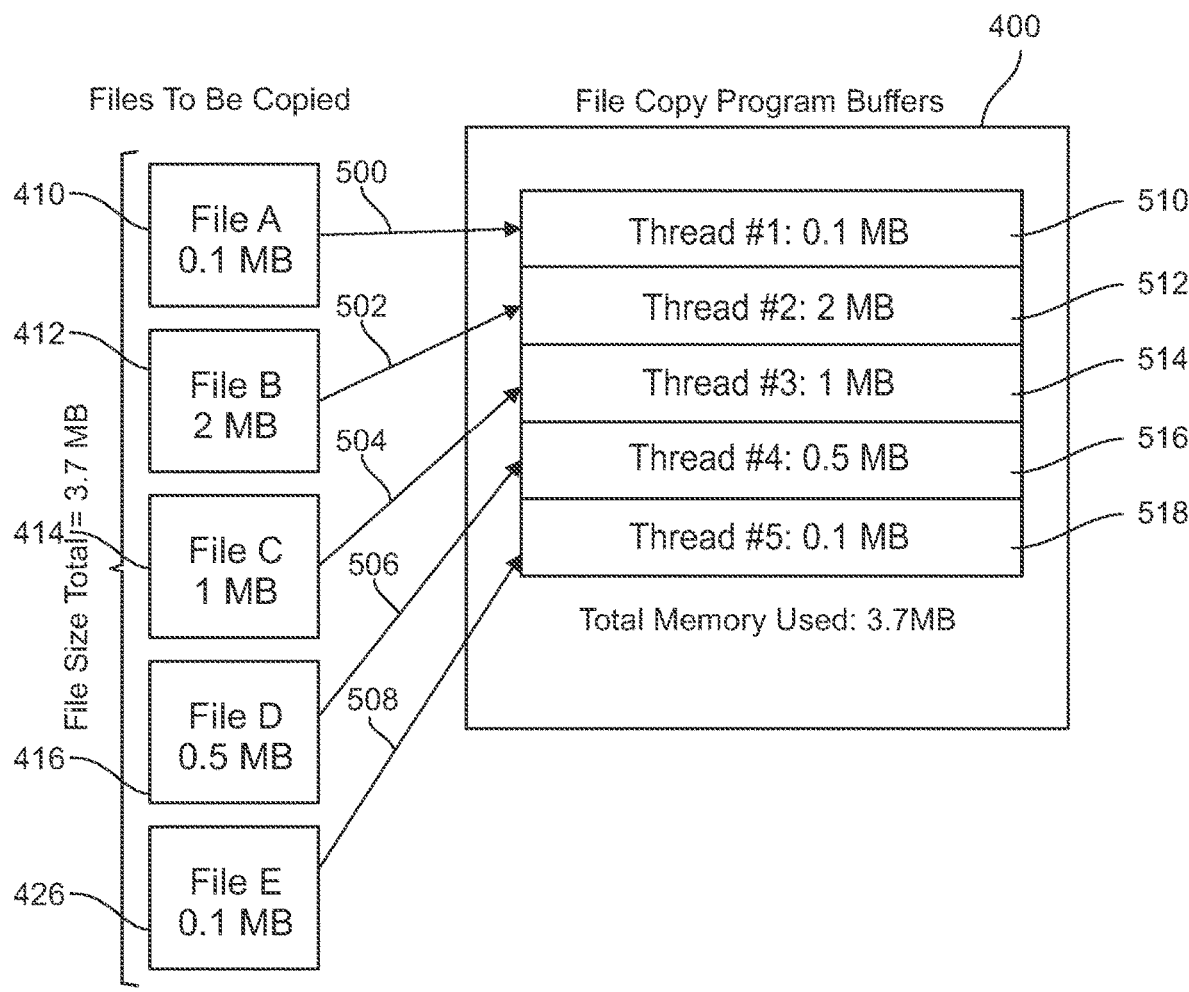
FIG. 5 is a schematic diagram illustrating an example of a copy program executing on a processor of a copy computer using variable buffer sizes for storing data read from a source file computer for embodiments of the invention.

FIG. 5 is a schematic diagram illustrating an example of a copy program executing on a processor of a copy computer using variable buffer sizes for storing data read from a source file computer for embodiments of the invention. Referring to FIG. 5, instead of arbitrarily fixing the number of threads and buffer size per thread, the copy program executing on the processor of the copy computer may first examine the sizes of the five files 410, 412, 414, 416, and 426 that require copying. In the example of FIG. 5, upon identifying five such files totaling 3.7 megabytes, the copy program may then start five threads 500, 502, 504, 506, and 508 and allocate five buffers 510, 512, 514, 516, and 518 equal to the size of each respective file. Thus, all five files may now be read into buffers simultaneously in one cycle, thereby reducing the time to read all files by half from 120 milliseconds to 60 milliseconds. It is to be understood that in actual practice, there will typically be a far greater number of files to be copied and that not all of the files may typically fit into available buffer memory at once. Consequently, more than one cycle of the read operation may be necessary.

FIG. 6 is a table that illustrates an example of a copy program executing on a processor of a copy computer using variable buffer sizes in storing data read from a source file computer in a sequence in which they are stored on the source file server for embodiments of the invention. Referring to FIG. 6, assume, for example, seven files to be copied, including file 600 having 0.1 megabyte, file 602 having three megabytes, file 604 having one megabyte, file 606 having 0.5 megabyte, and files 608, 610, and 612, each also having one megabyte. Also assume 4 megabytes of available memory.

Referring further to FIG. 6, normally, the copy program running on the processor of the copy computer may encounter files 600, 602, 604, 606, 608, 610, and 612 and 614 in the sequence in which they are stored on the source file server. Thus, only files 600 and 602 totaling 3.1 megabytes may be copied in a first cycle, because adding the one megabyte of file 604 would result in a cumulative total of 4.1 megabytes that exceeds the four megabytes of available memory by 0.1 megabyte. Referring again to FIG. 6, in a second cycle, only files 604, 606, 608, and 610 totaling 3.5 megabytes may be copied, because adding the one megabyte of file 612 would result in a cumulative total of 4.5 megabytes that likewise exceeds the four megabytes of available memory by 0.5 megabyte. Consequently, file 612 may be copied in a third cycle. Thus, three cycles are required to copy all of those files to buffers in the sequence in which they are stored on the source file server. Since each cycle is three operations, and assuming network latency of 20 milliseconds, each file read cycle requires 60 milliseconds for a total file read time of 180 milliseconds.

As noted, an aspect of embodiments of the invention may be to scan the source file server to identify all the files that need to be copied, make a list of those files, and arrange those files in an ascending order by file size before the copy process is initiated. Thus, instead of reading files in the order in which they are stored in the source file system, files to be read are first sorted according to ascending file size. Such aspect of embodiments of the invention provide optimal use of the buffer memory in each read cycle.

FIG. 7 is a table that illustrates an example of a copy program executing on a processor of a copy computer using variable buffer sizes in which files to be read are first sorted according to ascending file size for embodiments of the invention. Referring to FIG. 7, when files 600, 602, 604, 606, 608, 610, and 612 are sorted and read by ascending file size, only two cycles or 120 milliseconds are required to read all seven files. Thus, embodiments of the invention may involve not only sizing buffers to match file sizes, but may also sorting and processing the files from the source file server in ascending order of file size.

Referring again to FIG. 7, with the seven files sorted in ascending order of file size, files 600, 606, 604, 608, and 610 totaling 3.6 megabytes may be copied in a first cycle, while adding the one megabyte of file 612 would result in a cumulative total of 4.6 megabytes that exceeds the four megabytes of available memory by 0.6 megabyte. Consequently, both remaining files 612 and 602 totaling 3.5 megabytes may be copied in a second cycle, so only two cycles are required to copy those files from the source file server in ascending order of file size. Since each cycle is three operations, and assuming network latency of 20 milliseconds, each file read cycle requires 60 milliseconds and the total file read time is only 120 milliseconds.

Further, assume, for example, that file 602 is 10 megabytes instead of 3 megabytes as shown in FIG. 7. In that event, it may be necessary to read file 602 in respective cycles, of 4 megabytes, 4 megabytes, and 2 megabytes. Embodiments of the invention may address issues that arise in the event a single file to be read is larger than the total available memory. In that event, the copy program execution on the processor of the copy computer may create buffers of fixed equal size for every thread. In such mode, the size of the buffer and hence the number of threads may be matched to the largest packet which the network layer is able transport without fragmenting, also known as Maximum Transmission Unit (MTU).

It is to be understood that embodiments of the invention are not limited to any particular number or size of files to be copied, any particular number of simultaneous threads, any particular size of memory, or any particular number or size of buffers. For example, the limit on the number of threads may depend on the available memory of the copy computer on which the copy program is executing, because files that are read from the source computer must be stored in memory until those files can be written out to the target computer. Thus, in embodiments of the invention, a typical operation may involve using 10,000 threads to simultaneously copy 10,000 files at once.

Figure 8A:
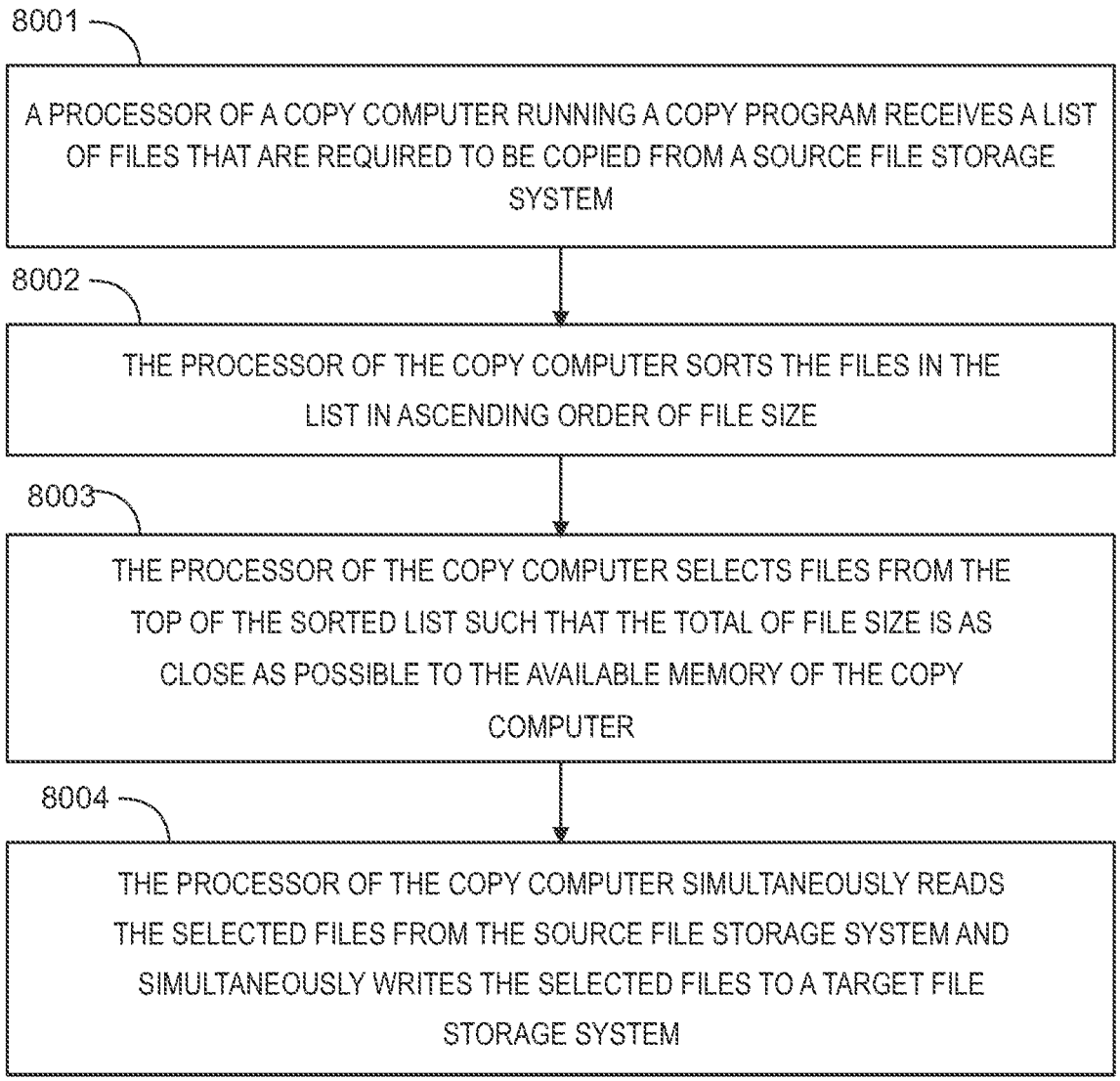

FIGS. 8A and 8B show a flow chart that illustrates an example of a process of copying a large number of small files over high latency networks using systems and methods for embodiments of the invention. Referring to FIGS. 1 and 8A, at 8001, a processor of a copy computer 104 running the copy program may receive a list of files that are required to be copied from a source file storage system 100. At 8002, the processor of the copy computer 104 running the copy program may sort the files in the list in ascending order of file size. Referring further to FIGS. 1 and 8A, at 8003, the processor of the copy computer 104 running the copy program may select files from the top of the sorted list such that the total of file size is as close as possible to the available memory on the copy computer 104 running the copy program. At 8004, the processor of the copy computer 104 running the copy program may simultaneously read the selected files from the source file storage system 100 and simultaneously write the selected files to a target file storage system 106.

Referring to FIGS. 1 and 8B, at 8005, the processor of the copy computer 104 running the copy program may repeat steps 8003 and 8004 until a file is encountered, the size of which is larger than the available memory on the copy computer 104 running the copy program. At 8006, when a file is encountered whose size is larger than the available memory on the copy computer 104 running the copy program, the processor of the copy computer 104 may break the file whose size is larger than the available memory into parts of size equal to the network MTU, create MTU-sized buffers to fill up the available memory, and simultaneously copy as many parts of the file whose size is larger than the available memory as the number of the buffers. At 8007, the processor of the copy computer 104 running the copy program may repeat step 8006 for each subsequent file.

Figure 9:
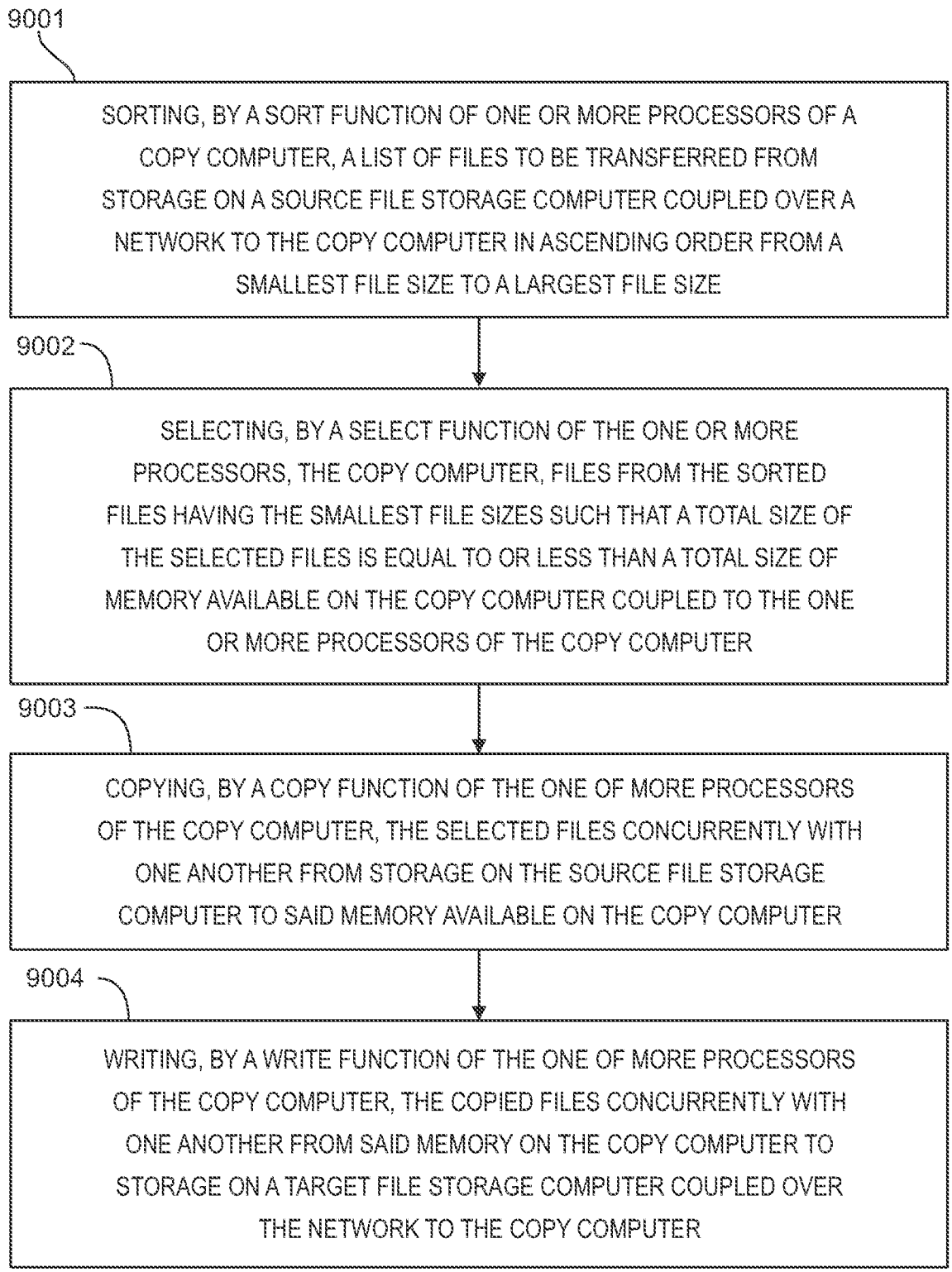
FIG. 9 is a flow chart that illustrates another example of a file copy process of copying a large number of small files over high latency networks for embodiments of the invention.

FIG. 9 is a flow chart that illustrates another example of a process of copying a large number of small files over high latency networks using systems and methods for embodiments of the invention. Referring to FIGS. 1 and 9, at 9001, a sort function of one of more processors of a copy computer 104 sorts a list of files to be transferred from storage on a source file storage computer 100 coupled over a network 102 to the copy computer 104 in ascending order from a smallest file size to a largest file size. At 9002, a select function of the one or more processors of the copy computer 104 selects files from the sorted files having the smallest file sizes such that a total size of the selected files is equal to or less than a total size of memory available on the copy computer coupled to the one or more processors of the copy computer 104.

Referring further to FIGS. 1 and 9, at 9003, a copy function of the one of more processors of the copy computer 104 copies the selected files concurrently with one another from storage on the source file storage computer 100 to said memory available on the copy computer 104. At 9004, a write function of the one of more processors of the copy computer 104 writes the copied files concurrently with one another from said memory on the copy computer 104 to storage on a target file storage computer 106.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system comprising:
a copy computer having one or more processors coupled to memory comprising a predetermined total memory capacity and communicatively coupled over a network to a source file storage computer and to a target file storage computer having available data storage capacity that exceeds the predetermined total memory capacity of the copy computer;
a sort function of the one or more processors of the copy computer that iteratively sorts, in an uninterrupted succession of read cycles, a list of files to be transferred from storage on the source file storage computer in ascending order from a smallest file size to a largest file size;
a list function of the one or more processors of the copy computer that compiles the list of the files to be transferred from storage on the source file storage computer;
a select function of the one or more processors of the copy computer iteratively selects files from the sorted files having the smallest file sizes such that a total size of selected files is equal to or less than the predetermined total memory capacity of the copy computer;
a memory allocation function of the one or more processors of the copy computer that iteratively allocates, in the uninterrupted succession of read cycles, the predetermined total memory capacity of the copy computer into a plurality of thread buffer portions of the predetermined total memory capacity of the copy computer based on respective sizes of each of the selected files;
a file size function of the one or more processors of the copy computer that:
determines that an encountered file in the selected files has a size that is greater than the predetermined total memory capacity of the copy computer,
determines a maximum packet size which may be transported without fragmenting,
creates thread buffer portions that are equal to the determined maximum packet size; and
breaks said encountered file into a number of parts of said encountered file, each of said number of parts of said encountered file having a size equal to or less than a size of the created thread buffer portions;
a copy function of the one or more processors of the copy computer that iteratively copies, in the uninterrupted succession of read cycles, respective ones of the selected files and parts of said encountered file in parallel with one another from storage on the source file storage computer to respective ones of said plurality of thread buffer portions of the predetermined total memory capacity of the copy computer based on said respective sizes of each of the sorted files and parts of said encountered files; and
a write function of the one or more processors of the copy computer that iteratively writes, in the uninterrupted succession of read cycles, the copied respective ones of the selected files and parts of said encountered files in parallel with one another from the respective ones of said plurality of thread buffer portions of the predetermined total memory capacity of the copy computer to storage on the target file storage computer.

2. The system of claim 1, wherein the copy computer further comprises the one or more processors executing a copy application.

3. The system of claim 1, wherein the network further comprises a computer network using Transmission Control Protocol/Internet Protocol.

4. The system of claim 1, further comprising a scan function of the one or more processors of the copy computer that scans the source file storage computer and identifies the files for the list of the files to be transferred from storage on the source file storage computer.

5. The system of claim 1, wherein the copy function of the one or more processors of the copy computer issues a series of commands to a processor of the source file storage computer.

6. The system of claim 5, wherein the copy function of the one or more processors of the copy computer issues the series of commands comprising an open file command, a read file command, and a close file command to the processor of the source file storage computer.

7. The system of claim 6, wherein the copy function of the one or more processors of the copy computer issues the open file command to the processor of the source file storage computer to prepare the selected files for reading.

8. A method, comprising:
iteratively sorting, by a sort function of one or more processors of a copy computer coupled to memory comprising a predetermined total memory capacity of the copy computer, in an uninterrupted succession of read cycles, a list of files to be transferred to storage on a target file storage computer coupled over a network to the copy computer and having available data storage capacity that exceeds the predetermined total memory capacity of the copy computer from storage on a source file storage computer coupled over a the network to the copy computer in ascending order from a smallest file size to a largest file size;
compiling, by a list function of the one or more processors of the copy computer, the list of the files to be transferred from storage on the source file storage computer;
iteratively selecting, by a select function of the one or more processors of the copy computer, files from the sorted files having the smallest file sizes such that a total size of selected files is equal to or less than the predetermined total memory capacity of the copy computer;
iteratively allocating, by a memory allocation function of the one or more processors of the copy computer, in the uninterrupted succession of read cycles, the predetermined total memory capacity of the copy computer into a plurality of thread buffer portions of the predetermined total memory capacity of the copy computer based on respective sizes of each of the selected files;
determining that an encountered file in the selected files has a size that is greater than the predetermined total memory capacity of the copy computer;
determining a maximum packet size which may be transported without fragmenting;
creating thread buffer portions that are equal to the determined maximum packet size;
iteratively breaking said encountered file into a number of parts, each of said number of parts having a size equal to or less than a size of the created thread buffer portions of the predetermined total memory capacity of the copy computer;

iteratively copying, by a copy function of the one or more processors of the copy computer, in the uninterrupted succession of read cycles, respective ones of the selected files and parts of said encountered file in parallel with one another from storage on the source file storage computer to respective ones of said plurality of thread buffer portions of the predetermined total memory capacity of the copy computer based on said respective sizes of each of the selected files and parts of said encountered file; and iteratively writing, by a write function of the one or more processors of the copy computer, in the uninterrupted succession of read cycles, the copied respective ones of the selected files and parts of said encountered file in parallel with one another from the respective ones of said plurality of thread buffer portions of the predetermined total memory en capacity of the copy computer to storage on the target file storage computer.

* * * * *